No. 612,269. Patented Oct. 11, 1898.
M. J. O'MEARA.
CHECK ROWER.
(Application filed May 5, 1898.)
(No Model.) 2 Sheets—Sheet 1.
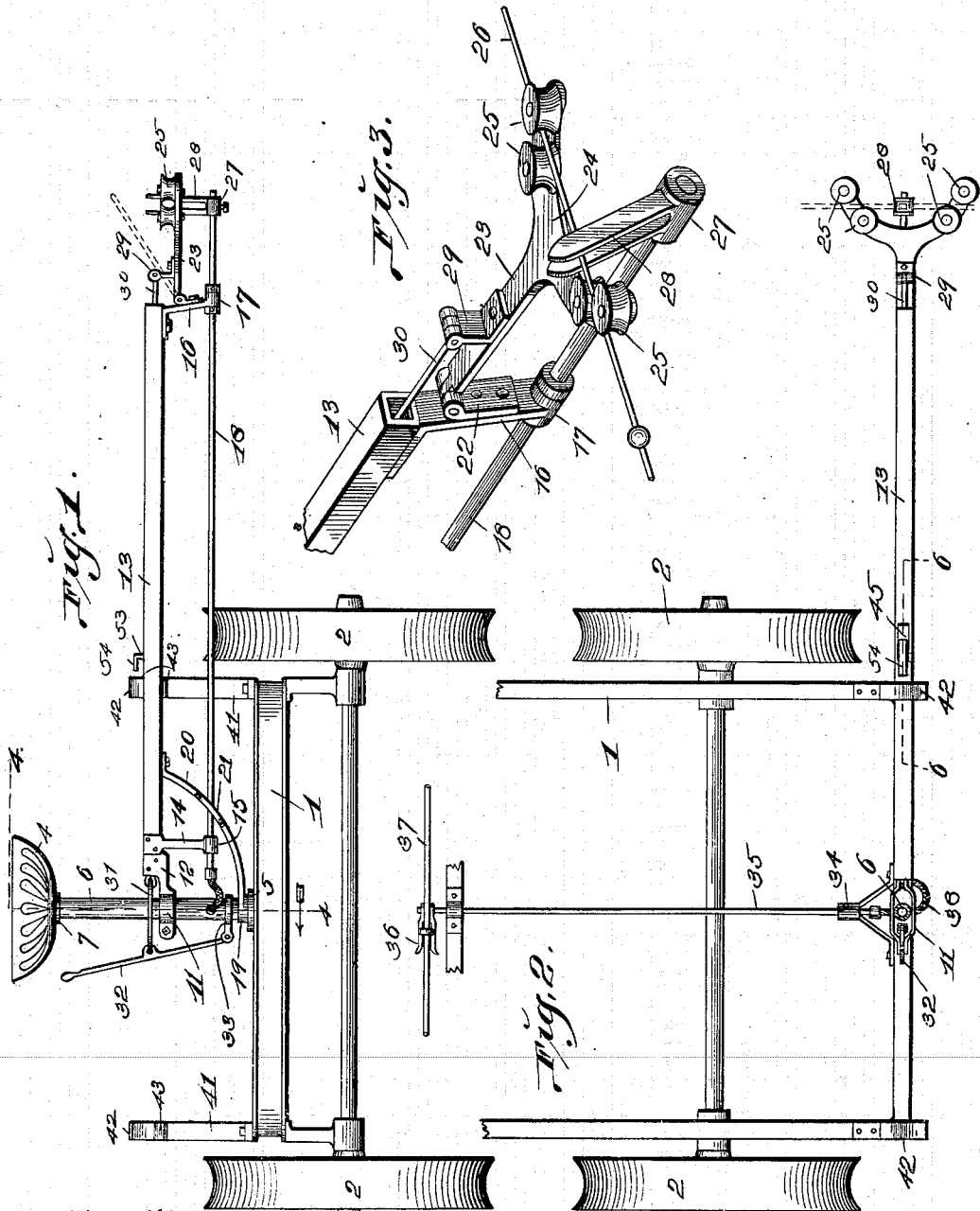

No. 612,269. Patented Oct. 11, 1898.
M. J. O'MEARA.
CHECK ROWER.
(Application filed May 5, 1898.)
(No Model.) 2 Sheets—Sheet 2.
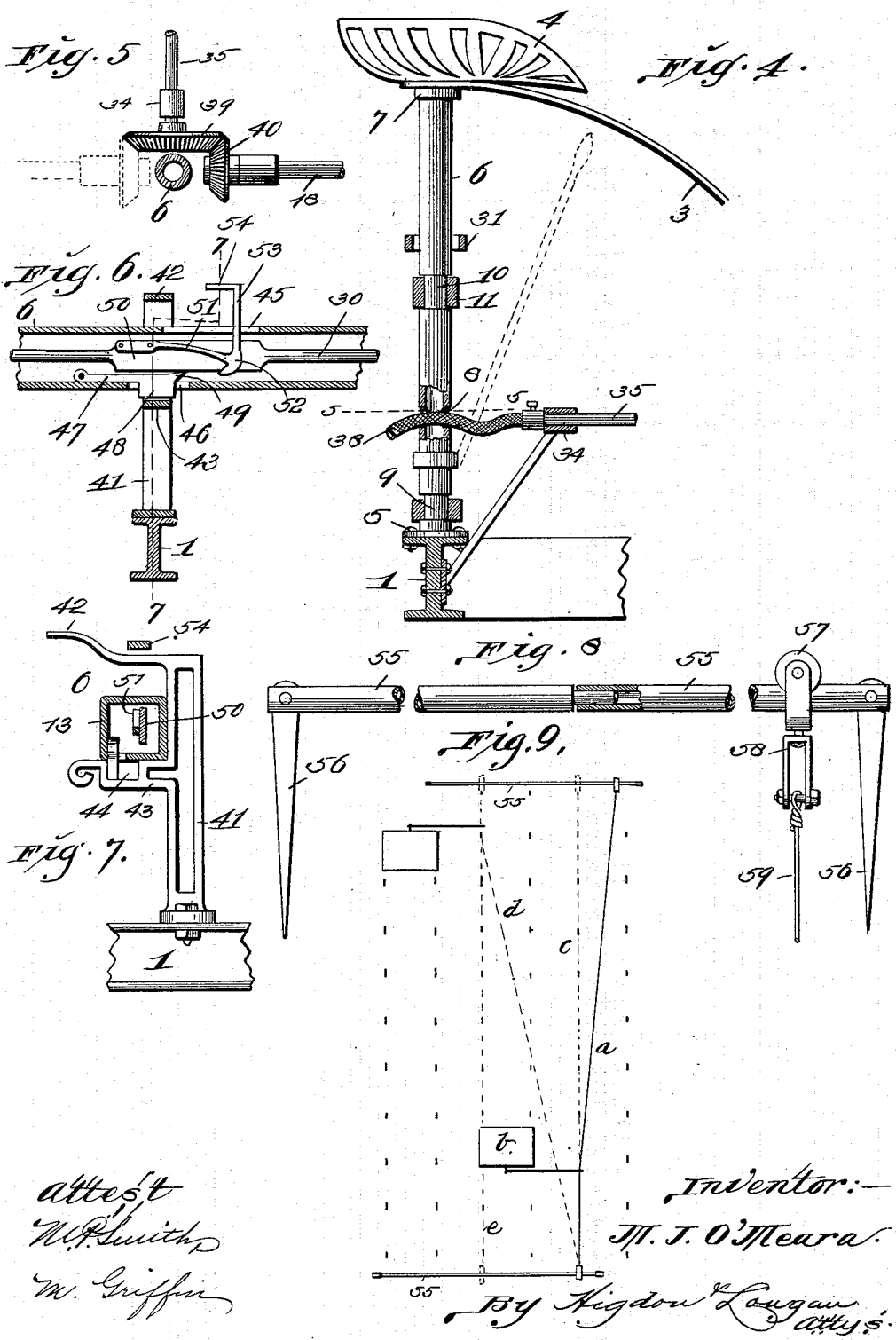

UNITED STATES PATENT OFFICE.

MOSES J. O'MEARA, OF VANDERVILLE, ILLINOIS.

CHECK-ROWER.

SPECIFICATION forming part of Letters Patent No. 612,269, dated October 11, 1898.

Application filed May 5, 1898. Serial No. 679,844. (No model.)

*To all whom it may concern:*

Be it known that I, MOSES J. O'MEARA, of the city of Vanderville, Christian county, State of Illinois, have invented certain new and useful Improvements in Check-Rowers, of which the following is a full, clear, and exact description, reference being had to the accompanying drawings, forming a part hereof.

My invention relates to check-rowers; and it consists of the novel construction, combination, and arrangement of parts hereinafter shown, described, and claimed.

Figure 1 is a rear elevation of my improved check-rower. Fig. 2 is a plan view of the rear portion of the check-rower seen in Fig. 1. Fig. 3 is a perspective view of the outer end of the arm carried by my improved check-rower that engages the wire. Fig. 4 is an enlarged detail sectional view, the same being taken approximately on the indicated line 4 4 of Fig. 1. Fig. 5 is a detail horizontal sectional view taken approximately on the line 5 5 of Fig. 4 and showing a modified form of the connection for the two rock-shafts employed in my improved check-rower. Fig. 6 is an enlarged vertical sectional view taken approximately on the line 6 6 of Fig. 2. Fig. 7 is a vertical sectional view taken approximately on the line 7 7 of Fig. 6. Fig. 8 is a side elevation, partly in section, of the device of which I make use in connection with my improved check-rower, one of which devices is anchored at each side of the field and to which the wire is attached. Fig. 9 is a diagrammatic view illustrating the use of my improved check-rower in connection with the wire and also with the anchoring devices seen in Fig. 8.

My invention relates more particularly to the mechanism and connections from the wire to the seed-dropping mechanism, and I have shown in the drawings only the rear portion of the planter-frame, this being sufficient, as my improvement is attached to the rear portion of the planter-frame and can be located upon any of the ordinary planters now in use.

Referring by numerals to the accompanying drawings, 1 indicates the planter-frame, which is carried upon the usual traction-wheels 2.

3 indicates the seat-spring, which carries upon its upper end the usual seat 4. Located upon top of the transverse portion of the frame 1 is a socket 5, in which is rigidly located the lower end of a tubular post 6, the upper end being seated in the socket 7, secured to the under side of the seat 4. Formed through this post 6, at a point a short distance above the lower end thereof, is an aperture 8, and a short distance below this aperture 8 said post 6 is reduced in diameter, as indicated by 9, and a short distance above said aperture 8 said post is reduced in diameter, as indicated by 10.

Rotatably arranged in the reduced portion 10 is a collar 11, with which is formed integral a laterally-projecting bifurcated arm 12, to which bifurcated arm is bolted the end of a tubular arm 13. Fixed to and depending from this arm 13, adjacent the end that is bolted in the bifurcated arm 12, is an arm 14, the lower end of which is formed into a bearing 15, and fixed to and depending from the under side of the outer end of the tubular arm 13 is a short arm 16, the end of which is provided with a bearing 17, which is in alinement with the bearing 15, and rotatably arranged in said alined bearings is a rock-shaft 18, the outer end of which projects a distance beyond the bearing 17.

Rotatably arranged in the reduced portion 9 in the lower end of the post 6 is a collar 19, with which is formed integral an upwardly-curved arm 20, that is bolted to and sustains the tubular arm 13, said curved arm 20 being provided with a yoke 21, through which the rock-shaft 18 passes.

Located upon the front face of the downwardly-pending arm 16 is a hinge-plate 22, to the upper end of which is hinged the rear end of a bar 23, with the forward end of which is formed integral a segmental arm 24, there being a pair of grooved rollers 25 arranged upon each end of this segmental arm 24.

The wire 26, used in connection with the check-rower, is adapted to pass between the pair of grooved rollers 25, and a set-collar 27 is located upon the outer end of the rock-shaft 18, said set-collar being provided with a pair of upwardly-projecting fingers 28, that operate between said pairs of rollers 25 and between which fingers passes the wire 26 when in proper position.

Fixed to and extending upwardly from the arm 23 is a short arm 29, to which is pivotally connected the outer end of a rod 30, that passes through the tubular arm 13, said rod projecting from the opposite end of said arm 13 and being there attached to a loop 31, that passes around the post 6 and is secured to the center of a hand-lever 32, that is fulcrumed to a collar 33, which is rotatably arranged upon the lower end of the post 6 between the aperture 8 and the collar 19.

Fixed to the inner face of the transverse portion of the frame 1 of the planter are arms that support a bearing 34, in which is rotatably arranged a rock-shaft 35, the forward end of which is provided with a pair of fingers 36, that are intended to operate a horizontally-moving rod 37, that actuates the seed-dropping mechanism of the planter, and connecting the rear end of this rock-shaft 35, that extends through the bearing 34, with the end of the rock-shaft 18, that projects beyond the bearing 15, is a short section of flexible shaft 38, that passes through the aperture 8 in the post 6. This flexible shaft may be dispensed with in some instances, and beveled pinions 39 and 40 may be located, respectively, upon the ends of the rock-shafts 35 and 18, this construction being illustrated in Fig. 5.

Bolted to each of the rear corners of the planter-frame 1 are the vertical posts 41, provided on their upper ends with the rearwardly-extending upwardly-curved arms 42 and also provided at their centers with the rearwardly-extending arms 43, the same being provided with the notches 44. These arms 43 are so located as that when the tubular arm 13 swings from one side of the planter to the other it will just clear the top surfaces of said arms 43, and to lock the tubular arm 13 in position on either side of the planter I have provided the mechanism now to be described, and illustrated in Figs. 6 and 7.

Formed in the top and bottom portions of the tubular arm 13, at a point approximately where said arm contacts with the arms 41, are the slots 45 and 46. Pivoted to the front wall of the tubular arm 13, to one side of the slot 46, is a latch 47, provided with the downwardly-pending forward end 48, that passes through said slot 46 and is arranged to drop into the notch 44 in the arm 43, and formed integral with the forward end of this latch 47 is an upwardly and outwardly projecting point 49. Formed integral with the rod 30, that passes through the tubular arm 13 at a point adjacent the slots 45 and 46, is a flat plate 50, to which is rigidly attached the rear end of a spring-arm 51, the forward end of which is provided with an integral hook 52, and projecting upwardly from said hook 52, through the slot 45, is an arm 53, that is provided with a horizontally-arranged upper end 54, that is adapted to pass over the lower portion of the curved arm 42, that projects from the upper end of the post 41 when the rod 30 is moved laterally.

The device or anchor that the wire used for operating my improved check-rower is attached to is illustrated in Figs. 8 and 9 and comprises a pair of tubular bars 55, which are arranged to be fitted together to form a continuous bar, the outer ends of each of said bars being provided with spikes 56, which are driven into the ground when the device is anchored at the side of the field. Attached to run upon this bar is a grooved pulley 57, that is provided with a swivel 58, to which is secured the end of the wire 59.

The operation of my improved check-rower is as follows: The arm 13 is swung to the side of the planter on which the wire is located, and as said arm 13 passes over the arm 43 the downwardly-projecting end 48 of the latch 47 will engage in the notch 44, and thus said arm 13 will be held in its proper position, which is in a right angle to the line of advance of the planter. The wire is now passed between the pairs of grooved pulleys 25 and between the upwardly-extending fingers 28. As the planter is moved forwardly across the field the knots upon the wire will successively engage against the fingers 28 and move the same rearwardly until said knots can pass off from the upper ends of said fingers, and as said fingers move rearwardly the rock-shaft 18 will be partially rotated and the motion thus obtained will be imparted, through the flexible shaft 38, to the rock-shaft 35 to partially rotate the same, and this motion will be transmitted to the rod 37, that controls the seed-dropping mechanism, by means of the fingers 36, carried upon the forward end of said rod 35. Said rod 37, being spring-actuated, will after being operated return to its normal position, and thus partially rotate the rock-shafts 35 and 18 to their normal positions, thus bringing the fingers 28 into position to be engaged by the next knot of the wire. The anchoring device having previously been located at opposite sides of the field and the wire properly connected to the swivels of the pulleys 57, which are operated on the anchoring devices, said wire will readily accommodate itself to the movement of the planter across the field, and if said anchoring devices be so located as to throw the wire at an angle relative to the rows that are being planted said wire will gradually assume a position parallel with the rows as the planter moves across the field, during which movement the pulleys 57 will ride upon the anchoring devices in order to accommodate the movement of the wire. For instance, should the wire be located in the position as indicated by the solid line $a$, Fig. 9, when the planter $b$ has started across the field said wire $a$ will gradually move over into a position parallel with the line of travel of said planter or into the position indicated by dotted lines $c$. When the planter is turned at the opposite side of the field, the wire will be in the position indicated by dotted lines $d$, and as said planter returns across the field said wire will gradually assume the position indicated by the dotted lines e. When either one of the pulleys 57 has moved to the end of the anchoring device, said anchoring device must necessarily be moved into a new position. This operation takes place after every third or fourth trip across the field by the planter. When the planter is turned at the end of the field and it is desired to swing the arm 13 to the opposite side of the planter from the side on which it has been located, the operator engages the upper end of the hand-lever 32 and pushes the same outwardly, this movement moving the rod 30 a short distance through the tubular arm 13 and swinging the arm 23 upwardly on its hinge, as indicated by dotted lines, Fig. 1. This movement elevates the wire 26 from between the fingers 28. Consequently said fingers and parts operated thereby will not operate, and as said rod 30 is thus moved laterally the hook 52 will engage beneath the point 49 of the latch 47 and the downwardly-pending portion 48 of said latch 47 will be elevated from the notch 44, while at the same time the laterally-turned end 54 of the vertical arm 53 will pass over the rear or lower portion of the upwardly-curved arm 42, carried by the post 41 on the side of the planter now occupied by the arm 13. As the latch 48 is thus elevated from the notch 44 the arm 13 is free to swing upon the post 6, and as the planter is now turned said arm 13 will swing around until the planter is in a reverse position, and said tubular arm 13 will now contact with the post 41, opposite from the post with which it was formerly in engagement. As the arm 13 swings away from the first-mentioned post 41 the outwardly-turned end 54 of the arm 53 will be engaged by the upwardly-turned end of the arm 42, and in so doing the hook 52 will move upwardly and become detached from the point 49 of the latch 47, and when this operation takes place the latch 47 will drop downwardly and be in a position to pass into the notch 44 of the arm 41 on the opposite side of the planter. As soon as the tubular arm 13 is released from the first post 41 and commences to turn the operator releases the hand-lever 32 and allows the same to swing beneath the seat-spring as the planter completes its turn. When the planter has been completely turned and the arm 13 is locked to the post 41, the wire is repositioned between the fingers 28, and the planter is now in position to operate in its return across the field.

A check-rower of my improved construction possesses superior advantages in point of simplicity, durability, and general efficiency, is easily operated, swings from one side of the planter to the other with the turning of the planter, and is very reliable and positive in action.

I claim—

1. A check-rower, constructed with a vertical post, a tubular arm swinging on said post, a wire-engaging device located upon the outer end of said arm, a rock-shaft carried beneath and parallel with said arm, fingers located upon said rock-shaft that engage the wire between the wire-engaging device on the end of the tubular arm, a rock-shaft for operating the seed-dropping mechanism, a flexible connection between the ends of the rock-shafts, and means whereby the swinging tubular arm is locked on either side of the check-rower, substantially as specified.

2. A check-rower, constructed with a vertical post between the frame and the seat, a tubular arm swinging from said post, means whereby said arm is locked upon either side of the check-rower, a wire-engaging device swinging from the end of the tubular arm, a rock-shaft rotatably held beneath the tubular arm, a rock-shaft for operating the seed-dropping mechanism, a flexible shaft connecting the two rock-shafts, and a rod passing through the tubular arm for elevating the wire-engaging mechanism, substantially as specified.

3. In a check-rower, a vertically-arranged post, an arm swinging from said post, posts carried by the rear corners of the check-rower frame, which posts are provided with laterally-projecting notched arms and with laterally-projecting upwardly-curved arms, a latch carried by the swinging arm for engaging in the notches of the laterally-projecting arms of the posts, and means carried by the swinging arm for disengaging the latch from either one of said notches, substantially as specified.

4. The combination with a check-rower provided on its rear corners with vertical posts, of a post arranged at the center of the rear of the check-rower frame, an arm swinging from said post, a latch carried by said arm for engaging either one of the posts on the rear corners of the check-rower frame, a wire-engaging device hinged to the outer end of the swinging arm, suitable connections from said wire-engaging device to the seed-dropping mechanism, a laterally-moving rod passing through the tubular arm for elevating the wire-engaging device, and means carried by said rod for engaging the latch carried by the swinging tubular arm, substantially as specified.

In testimony whereof I affix my signature in presence of two witnesses.

MOSES J. O'MEARA.

Witnesses:
EDWARD E. LONGAN,
M. P. SMITH.